United States Patent [19]

Hastings

[11] 4,186,760

[45] Feb. 5, 1980

[54] FUEL CONTROL ASSEMBLY FOR BURNERS

[75] Inventor: Thomas C. Hastings, Willowdale, Canada

[73] Assignee: The Coleman Company, Inc., Wichita, Kans.

[21] Appl. No.: 868,399

[22] Filed: Jan. 10, 1978

[51] Int. Cl.² ............... F23D 11/38; F23D 13/28
[52] U.S. Cl. .................................. 137/244; 137/553; 251/260; 403/315; 403/405; 431/123
[58] Field of Search ............... 137/242, 244; 431/123; 222/149; 239/116, 117

[56] References Cited

U.S. PATENT DOCUMENTS

| | | | |
|---|---|---|---|
| Re. 29,457 | 10/1977 | Hastings | 431/123 |
| 2,154,811 | 4/1939 | Goss | 137/244 X |
| 2,704,650 | 3/1955 | Rand | 251/324 |

*Primary Examiner*—Martin P. Schwadron
*Assistant Examiner*—Richard Gerard

[57] ABSTRACT

A fuel control assembly includes a valve closure member, a fuel inlet restricting member, and a fuel outlet cleaning member which are connected together for simultaneous movement. The valve closure member is movable within a valve body by a crank pin on a rotatable valve control shaft, and the valve closure member is movable in both directions beyond a sealing position in which the valve closure member cooperates with the valve body to shut off fuel flow through the valve body. Movement of the valve closure member in one direction beyond the sealing position maintains the fuel flow path closed and moves the fuel outlet cleaning member into the fuel outlet orifice to clean the orifice. Movement of the valve closure member in the other direction beyond the sealing position maintains the fuel flow path open and first moves the fuel inlet restricting member into the fuel inlet to restrict fuel flow through the inlet and thereafter moves the fuel inlet restricting member out of the fuel inlet to permit fuel to flow through the inlet unrestricted.

7 Claims, 6 Drawing Figures

FUEL CONTROL ASSEMBLY FOR BURNERS

BACKGROUND

This invention relates to vaporized fuel burners such as gasoline lanterns and camp stoves, and, more particularly, to a fuel control assembly for vaporized fuel burners which includes a single control member for operating the fuel flow valve, the orifice cleaner, and the inlet restricting member.

The invention is an improvement over the fuel control assembly for lanterns and stoves which is described in U.S. Pat. No. Re. 29,457 and Canadian Pat. No. 973,082 and the fuel control assembly for stoves which is referred to in the Declaration filed with U.S. Pat. No. Re. 29,457.

As described in said patents, vaporized fuel burners such as lanterns and camp stoves generally include a fuel tank, a fuel conduit including a generator tube, and burning means which is supplied with a mixture of fuel from the conduit and air. The generator tube is positioned adjacent the burning means so that fuel passing through the generator tube is vaporized, and a valve is interposed in the fuel conduit to open and close the fuel passage therethrough. A cleaner rod is usually mounted within the generator tube and is movable into and out of the discharge orifice of the generator to clean the orifice and, if desired, to regulate the flow of fuel therethrough. When the burning means is to be lighted and before the generator tube is heated sufficiently to vaporize the fuel, a restricting rod is used to restrict the flow of fuel into a chamber below a fuel tube to permit air to flow through the chamber and become entrained with the fuel passing into the fuel tube. This rod is removed from the fuel inlet when the generator is heated sufficiently to vaporize the fuel.

The fuel control assembly described in said patents and said Declaration utilizes a single control member for actuating the shut off valve, the generator orifice cleaner rod, and the inlet restricting rod in the proper sequence. Rotation of the control member from an off position to a clean position moves the cleaner rod into the generator orifice to clean the orifice; rotation of the control member from the clean position to a light position moves the cleaner rod out of the generator orifice, opens the shut off valve, and moves the restricting portion of the inlet restricting rod into the fuel inlet to restrict the flow of fuel and to permit the burner to be lighted; and rotation of the control member from the light position to a run position moves the restricting portion of the inlet restricting rod out of the fuel inlet to permit fuel to flow through the inlet unrestricted.

The foregoing fuel control assembly requires a number of separate parts which must be individually positioned within the valve body and which must at times move independently of each other. The shut off valve is a poppet-type valve which moves upwardly to its closed position as the cleaner rod moves upwardly toward the generator orifice. However, the valve reaches its closed position before the cleaner rod enters the generator orifice, and the cleaner rod must continue to move upwardly after the poppet valve has seated and has stopped moving. This requires a separate linkage between the poppet valve and the cleaner rod so that the poppet valve can be disassociated from further movement of the cleaner rod when the valve closes, a spring to maintain the valve closed, and a valve seat. The separate, individual parts which are used in the assembly increase the cost of the assembly and require time and skill to be assembled properly. Further, the accumulated tolerances of the parts require the parts to be machined within close tolerances, resulting in additional costs. The poppet valve moves against a valve seat to shut off the fuel flow, and proper sealing might be prevented by machining chips, dirt, etc. which could lodge between the valve and the valve seat.

SUMMARY OF THE INVENTION

The invention uses an O-ring piston valve which shuts off fuel flow by a sliding or shearing action as the O-ring moves into a reduced-diameter portion of the valve body. The piston valve is free to move beyond the shut-off point in both the flow mode and no-flow mode of the valve, but the shut-off point within the valve body remains fixed. The outlet cleaner rod and the inlet restricting rod are connected directly to the piston valve, and all of these parts move simultaneously. The poppet valve, the valve seat, and the separate linkage between the control member and the restricting rod are therefore eliminated, and the assembly is simpler, more economical, and more reliable. The simplicity of the assembly and the direct connection between fewer parts enables the parts to be assembled correctly and rapidly with minimal visual observation.

DESCRIPTION OF THE DRAWING

The invention will be explained in conjunction with an illustrative embodiment shown in the accompanying drawing, in which.

DESCRIPTION OF SPECIFIC EMBODIMENT

Figure 1:
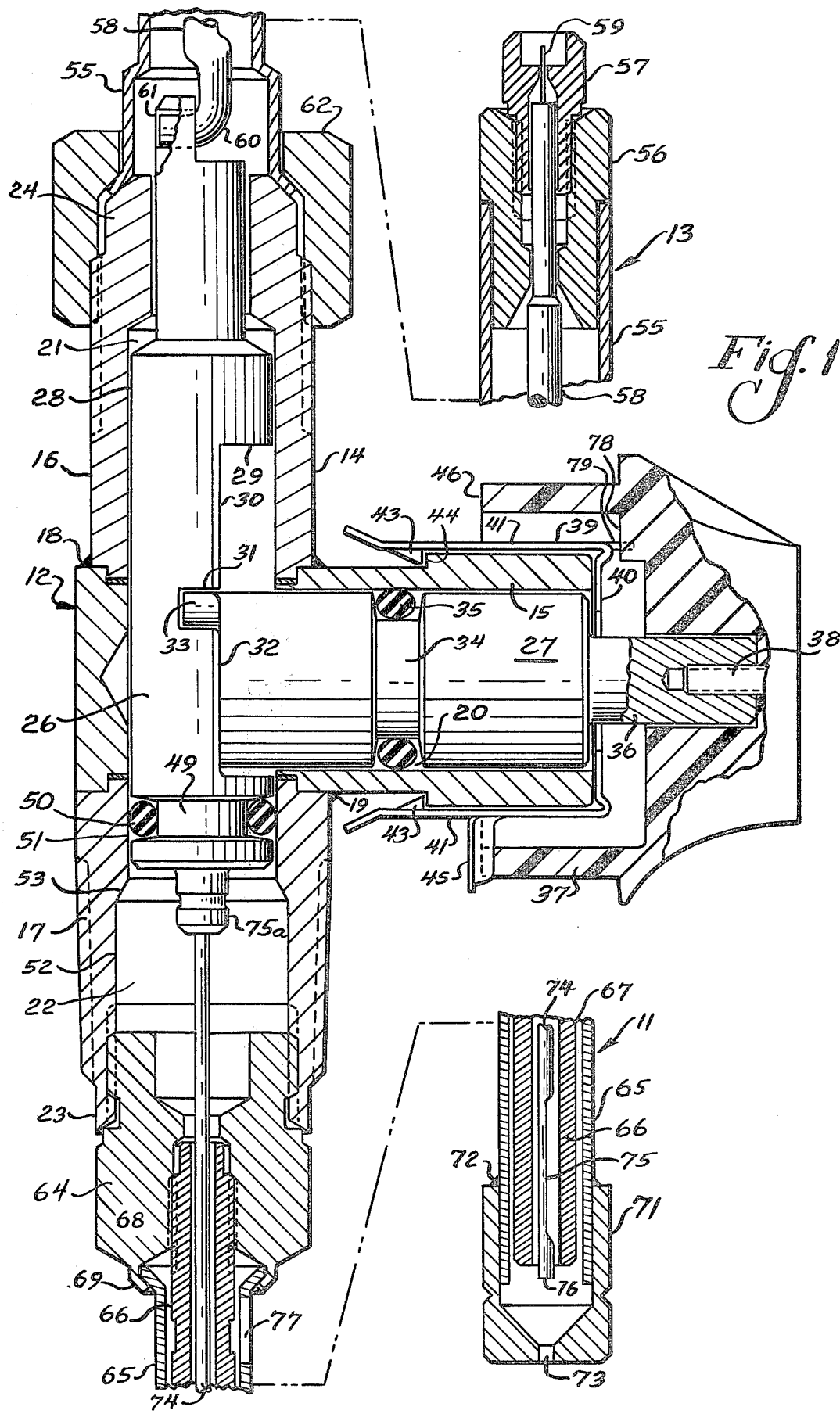
FIG. 1 is an elevational sectional view, partially broken away, of a fuel control assembly formed in accordance with the invention.

The numeral 10 designates generally a fuel control assembly of the type described in U.S. Pat. No. Re. 29,457 and Canadian Pat. No. 973,082, and these patents may be referred to for the details of the assembly and for the relationship between the fuel control assembly and the fuel burner, e.g., a gasoline lantern or a camp stove.

The fuel control assembly includes a fuel inlet assembly 11, a valve assembly 12, and a generator assembly 13. As described in said patents, these assemblies are interconnected and provide a fuel conduit or flow passage for the fuel. Fuel is conducted from a fuel tank through the fuel control assembly to a fuel burner assembly, and the flow passage through the fuel control assembly is opened or closed by the valve assembly.

The valve assembly includes a generally T-shaped valve body 14 which includes a cylindrical shaft housing 15 and upper and lower cylindrical bushings 16 and 17 which extend perpendicularly to the shaft housing and which are secured thereto, as by silver soldering 18 and 19, respectively. Alternatively, the valve body could comprise a single-piece forging.

The shaft housing 15 is provided with a central bore 20, and the upper and lower bushings 16 and 17 are provided with central bores or passages 21 or 22, respectively, which communicate with the bore 20 to form an elongated fuel passage from the lower end 23 of the valve body to the upper end 24.

A valve piston or closure member 26 is slidably positioned within the fuel passage of the valve body, and is reciprocable by a control shaft 27. The valve piston includes a cylindrical outer surface 28 having an outer diameter sufficiently smaller than the diameter of the fuel passage through the valve body to permit unrestricted flow of fuel between the piston and the valve body. A recess 29 is milled into one side of the piston and has a flat surface 30 which extends parallel to the axis of the piston and a cam follower groove or slot 31 which extends transversely across the width of the flat surface 30.

The control shaft 27 is rotatably within the shaft housing 15 and has a flat inner end surface 32 which extends adjacent the flat surface 30 of the piston and a cam or crank pin 33 which is eccentrically mounted with respect to the axis of the control shaft and which extends into the slot 31 of the piston. As the crank pin rotates with the control shaft, it will reciprocate the valve piston within the valve body. The crank pin is positioned at the top of its arcuate movement in FIG. 1, and rotation of the control shaft either clockwise or counterclockwise will cause the valve piston to move downwardly.

The control shaft is provided with an annular groove 34, and an O-ring 35 in the groove sealingly engages the shaft housing and prevents fuel from leaking through the shaft housing. The control shaft includes an outer end portion 36 of reduced diameter which extends outwardly beyond the shaft housing, and a control knob 37 is mounted on the end portion by a screw 38.

The control shaft is retained within the shaft housing by a retainer clip 39 which includes an annular ring 40 which extends radially inwardly over the end of the housing and a plurality of circumferentially spaced flexible and resilient fingers 41 which extend over the outer surface of the housing. The annular ring 40 is engageable with the shoulder 42 of the control shaft, and each of the fingers 41 includes a projection 43 which is engageable with a shoulder 44 on the outside of the shaft housing to retain the clip on the shaft housing. A flexible and resilient detent finger 45 extends radially outwardly from one of the fingers and is engageable with recesses on the inner edge 46 of the control knob 37 to provide tactile and audial evidence of the various operating positions of the control knob.

The lower end of the valve piston is provided with a groove 49 in which an O-ring 50 is positioned. The lower bushing 17 includes a first cylindrical inner surface 51 which has a diameter smaller than the outside diameter of the O-ring and which is sealingly engageable with the O-ring and a second cylindrical inner surface 52 which has a diameter larger than the outside diameter of the O-ring. A camming shoulder 53 joins the surfaces 51 and 52.

The shoulder 53 defines the shut-off point for the valve piston. When the O-ring is below the shoulder, fuel can flow freely past the O-ring and through the valve body. When the O-ring engages the shoulder or the small-diameter surface 51, fuel flow through the valve body is shut off. The valve shuts off fuel flow by a sliding action of the O-ring against the shoulder and the surface 51, and the valve can continue to move beyond the shut-off point without affecting the seal. Conversely, the valve can move downwardly beyond the shut-off point while maintaining the fuel passage open.

The generator assembly 13 is similar to the generator assembly described in U.S. Pat. No. Re. 29,457 and Canadian Pat. No. 973,082. The generator assembly includes a generator tube 55, a bushing 56 which is mounted on the upper end of the tube, and a gas tip 57 which is mounted within the bushing and which is provided with a fuel outlet orifice through which fuel passes from the generator to the burner assembly. A cleaner rod 58 extends axially within the generator tube, and a cleaner needle 59 is mounted on the upper end of the cleaner rod and is sized to fit relatively snugly within the outlet orifice of the generator assembly when the cleaner rod is reciprocated upwardly to remove carbon and other material from the orifice. The lower end of the cleaner rod includes a connecting portion 60 which extends perpendicularly to the axis of the generator tube and which is inserted into an opening 61 in the valve piston 26. The bottom of the generator tube is connected to the upper end of the valve body by a nut 62 which is threadedly engaged with the valve body.

The fuel inlet assembly 11 includes a bushing 64 which is threadedly engaged with the lower end of the valve body, an outer tube 65, and an inner tube 66 which is concentrically mounted within the outer tube and which has an outer diameter less than the inner diameter of the outer tube to provide an annular chamber 67. The upper end of the inner tube is threadedly engaged with the bushing 64, and the upper end of the outer tube is flared outwardly at 68 and is secured to the bushing 64 by a ring 69 on the bushing which is crimped over the flared end of the outer tube. A lower bushing 71 is fitted over the lower end of the outer tube and soldered thereto at 72. A fuel inlet orifice 73 extends through the bushing 71 in alignment with the axis of the inner tube 66.

An inlet restricting rod 74 extends through the inner tube 66 and is connected to the lower end of the valve piston for movement with the valve piston. The valve piston includes a downwardly extending projection 75a, and the inlet restricting rod can be attached to the projection in any suitable fashion, as by clinching the rod into the projection.

The diameter of the inlet restricting rod 74 relative to the inside diameter of the inner tube 66 is such that fuel can flow freely upwardly through the inner tube without interference from the rod. An axial portion 75 of the rod adjacent the lower end thereof is provided with a reduced diameter or thickness, and the narrow portion 75 of the rod is separated from the lower end by a restricting end portion 76 having a diameter equal to that of the remainder of the rod.

The fuel inlet assembly 11 extends into the fuel tank of the lantern or stove as described in the aforementioned patents, and the fuel within the tank is pressurized by means of a hand pump. The upper end of the outer tube 65 is provided with an air opening 77 so that air pressure within the annular chamber 67 between the inner and outer tubes is equal to the air pressure within the fuel tank.

The various rotational positions of the control shaft 27 and the crank pin 33 thereon are illustrated in FIG.

Figure 6:
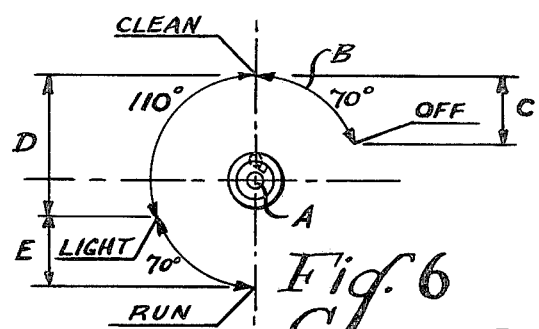
FIG. 6 illustrates the rotational movement of the crank pin which reciprocates the valve piston.
Figure 4:
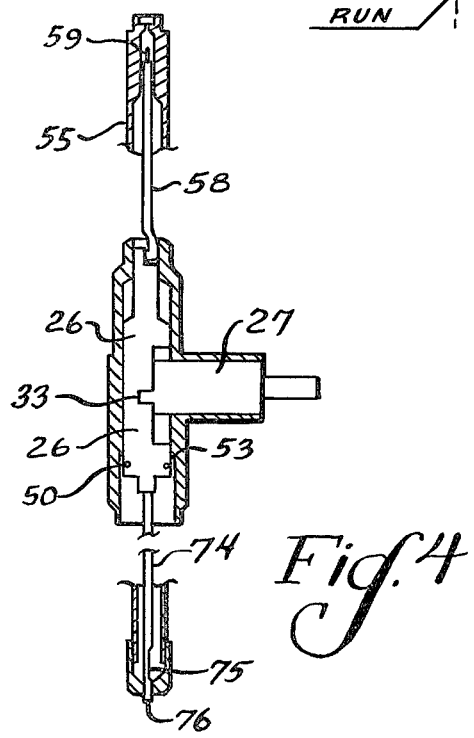
FIG. 4 is a view similar to FIG. 3 showing the fuel control assembly in the light position.

6, and the positions of the piston valve 26, cleaner rod 58, and inlet restricting rods 74 are shown in FIGS. 2–5. In FIG. 6 the arcuate path of movement of the crank pin 33 relative to the axis A of rotation of the control shaft is indicated by the letter B.

Figure 2:
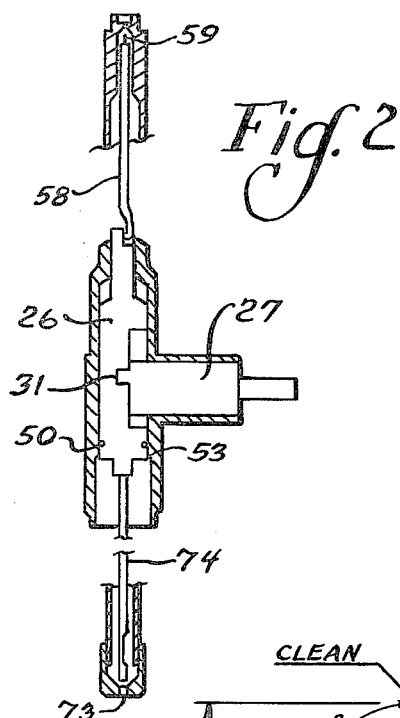
FIG. 2 is a view similar to FIG. 1 showing the fuel control assembly in the off position.
Figure 3:
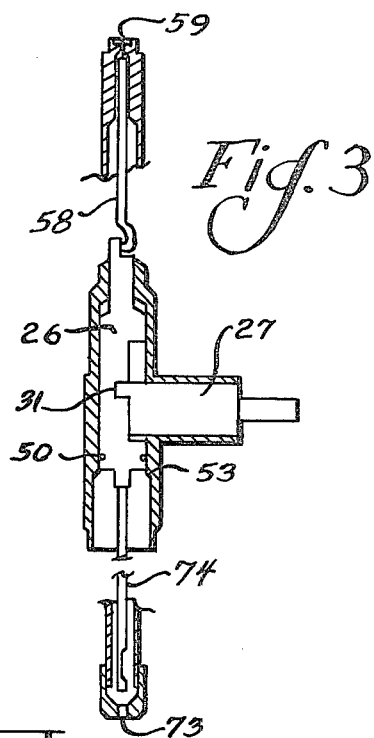
FIG. 3 is a view similar to FIG. 2 showing the fuel control assembly in the clean position.

The fuel control assembly is shown in its off position in FIG. 2. In this position the crank pin is approximately 70° from its uppermost point of movement (see FIG. 6), and the O-ring valve 50 closes the fuel path, the cleaner rod 58 is out of the generator orifice, and the inlet restricting rod 74 is above the inlet orifice 73.

When the control knob is rotated counterclockwise from its off position to the clean position, the crank pin moves to its uppermost position and moves the piston valve 26 upwardly a distance C (FIG. 6). The upward movement of the valve piston moves the needle of the cleaner rod 58 into the generator orifice (FIG. 3) and moves the inlet restricting rod 74 farther above the inlet orifice. The O-ring valve 50 slides upwardly within the valve body and maintains the fuel path closed.

Figure 5:
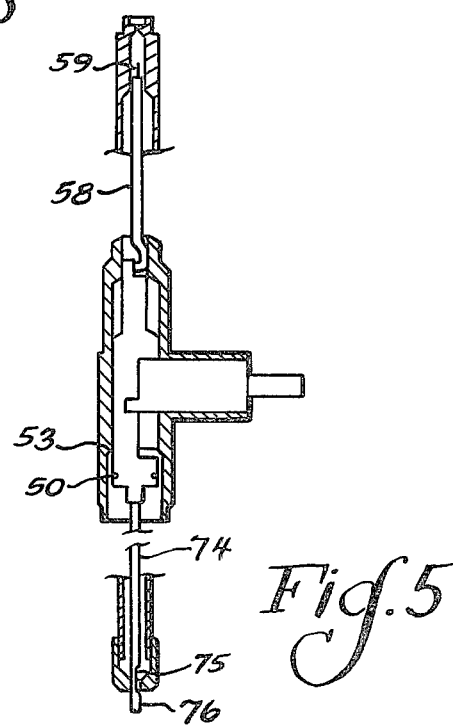
FIG. 5 is a view similar to FIG. 4 showing the fuel control assembly in the run position.

When the control knob is rotated counterclockwise from its clean to its light position, the crank pin moves the piston valve downwardly a distance D (FIG. 6), and the cleaner rod moves out of the generator orifice. The dimension D is greater than the dimension C, and the O-ring valve 50 passes below the shoulder 53 of the valve body and opens the fuel flow path through the valve body. When the control knob is in the light position, the restricting end portion 76 of the inlet restricting rod is positioned in the fuel inlet orifice (FIG. 5).

When the control knob is rotated counterclockwise from its light position to its run position, the crank pin moves to its lowermost position (FIG. 6), and the valve piston moves downwardly an additional distance E. This downward movement moves the restricting end portion 76 of the inlet restricting rod below the inlet orifice and positions the reduced portion 75 of the rod within the orifice. The cleaner rod moves farther below the generator orifice, and the O-ring valve 50 moves farther below the shoulder 53.

Clockwise rotation of the control knob from the run position to the off position will reverse the foregoing movements. The O-ring valve 50 will move into sealing position shortly after the control knob passes the light position and will remain in sealing position thereafter even though the O-ring will reciprocate within the valve body. The needle of the cleaner rod will move into the generator orifice as the control knob moves to the clean position, and the needle will be withdrawn from the orifice as the control knob continues to its off position.

The operation of the lantern or other fuel burner is identical to that described in said U.S. Pat. No. Re. 29,457 and Canadian Pat. No. 973,082. Briefly, when the fuel control assembly is in the light position, the restricting end portion 76 is in the inlet orifice and restricts flow of fuel into the chamber 67 between the inner and outer tubes 66 and 65 of the fuel inlet assembly. The air pressure within the chamber is equal to the air pressure within the pressurized fuel tank due to the opening 77 in the outer tube, and the pressure within the chamber 67 forces fuel from the chamber up through the inner tube past the open valve faster than fuel can flow through the inlet orifice. The level of the fuel within the chamber 67 will drop below the lower end of the inner tube 66, and some air from the chamber 67 will become entrained with fuel and pass upwardly through the inner tube 66. The liquid fuel and air passes upwardly through the valve assembly 12 and the generator assembly 13 and issues from the generator orifice as an atomized spray. As described in the aforementioned patents, the atomized spray is conducted through a burner tube to a mantle where it is ignited by a match or the like held adjacent to the mantle.

When heat from the mantle heats the generator assembly sufficiently, fuel passing through the generator assembly is converted from a liquid to a vapor state, and the mantle begins to burn with a brilliant incandescence. The control knob is then rotated from the light position to the run position, thereby moving the restricting end portion of the inlet restricting rod below the fuel inlet orifice. The fuel flow rate through the orifice is thereby increased sufficiently to cause the level of the fuel in the chamber 67 to rise above the lower end of the inner tube 66, and air from the chamber 67 no longer becomes entrained in the fuel that is forced upwardly through the inner tube 66. As the liquid fuel passes upwardly through the heated generator assembly, it is vaporized, and the gas vapor issues from the generator orifice at high energy and entrains and mixes air with it as it proceeds to the mantle.

The foregoing fuel control assembly not only requires fewer parts and provides more reliable operation, but it is considerably easier to assemble. The piston valve 26 is inserted through the lower end 23 of the valve body and is oriented so that the milled surface 30 faces the shaft housing 15. The valve piston fits freely into the valve body and is moved freely until the O-ring 50 yields interference with the reduced bore diameter at the shoulder 53, this interference being readily sensed by the assembler. This places the cam follower slot 31 in line with the axis of the bore through the shaft housing 15. The shaft 27 is then inserted into the shaft housing, and when the shaft engages the piston 26, the shaft is rotated slightly until the crank pin 33 is inserted into the slot 31. The spring retainer clip 39 is then snapped into place over the end of the shaft housing, thereby completing the valve assembly. The components of the valve assembly can be assembled correctly and rapidly with minimal visual observation by even an inexperienced worker.

It should be noted that the O-ring valve 50 is positioned upstream of the shaft housing 15 of the valve body, i.e., toward the source of fuel. This is a safety feature that permits shut off of fuel delivery from the fuel tank should a leak develop at the O-ring 35 of the control shaft 27.

Although I have described the O-ring valve 50 as being mounted on the movable valve piston and being engageable with the shoulder 53 on the valve body, these parts can be reversed. The O-ring can be mounted in a groove in an otherwise straight-walled valve body, and the valve piston could include a small diameter upper portion and a large diameter lower portion with a shoulder therebetween which engages the O-ring as the valve piston moves upwardly past the light position.

The lantern described herein can be readily modified for use with kerosene fuel. The valve assembly 12 can be used for a kerosene lantern without change, although an adjustment of the air-fuel mixture in the venturi of the lantern external to the valve and generator system should be made as is well known in the art. A kerosene lantern is not subject to direct lighting as is a lantern using naphtha fuels, and a kerosene lantern should be equipped with means for prior initial preheating of the generator, such as an alcohol or kerosene preheater cup at the base of the generator. Since such preheating means are well known, they need not be described herein. Such a construction would allow the same lantern to be used interchangeably for both naphtha and kerosene type fuels.

An alternate construction for use with kerosene fuel only and which therefore requires full reliance on separate preheating of the generator, e.g., by an alcohol preheater cup, is identical to the construction described and illustrated in FIG. 1 except that the following parts may be eliminated from FIG. 1: the restricting rod 74, the outer tube 65, the projection 75a, the ring 69, the bushing 71, and the "Light" detent on the control knob. In this construction some of the merits of the naphtha operation described with respect to FIG. 1 are preserved, namely, the single control knob operation provides automatic cleaning of the gas tip orifice 57 twice during each cycle (when turned on and again when turned off), the cleaning needle 59 is withdrawn from the gas tip 57 in the off position to yield a "courtesy dwell" slow extinction on shut down as well as insuring purging of the generator at the end of the operating cycle, the needle 59 is fully extracted from the gas tip 57 in the operating mode, visual, audible, and tactile indication of the "on" and "off" positions is provided plus mechanical clutching of the mechanism at these respective positions, and the construction and assembly is simplified.

The rotation of the control knob and the vertical movement of the valve piston is reversible over the full range of movement between the off and run positions. For example, it is sometimes desirable to move the fuel control assembly from its run position to its light position for a few seconds and then back to the run position, or from the run position to the clean position and then back to the run positions, etc.

The control knob can also be provided with a mechanical stop for preventing movement of the control knob and the control shaft beyond the off and run positions. Referring to FIG. 1, a boss 78 which is molded integrally with the knob engages a projection 79 on the retainer clip 37 to prevent clockwise rotation of the knob beyond the off position. The boss is engageable with the projection when the knob is rotated counterclockwise to the run position to prevent further counterclockwise rotation.

While in the foregoing specification a detailed description of a specific embodiment of the invention was set forth for the purpose of illustration, it will be understood that many of the details hereingiven may be varied considerably by those skilled in the art without departing from the spirit and scope of the invention.

I claim:

1. An improved fuel control assembly for a fuel burning apparatus comprising:
   (a) an elongated valve body having first and second ends and a fuel passage extending axially therethrough from one end to the other end,
   (b) a fuel inlet conduit connected to the first end of the valve body and having a fuel passage therethrough communicating with the fuel passage of the valve body and a fuel inlet orifice,
   (c) a fuel outlet conduit connected to the second end of the valve body and having a fuel passage therethrough communicating with the fuel passage of the valve body and a fuel outlet orifice,
   (d) a movable valve closure member axially slidably mounted within the valve body,
   (e) a control member rotatably mounted on the valve body for rotation about an axis extending perpendicularly to the direction of sliding movement of the valve closure member,
   (f) crank means connecting the control member and the valve closure member for reciprocating the valve closure member within the valve body as the control member rotates,
   (g) valve means on the valve closure member and the valve body for closing the fuel passage through the valve body when the valve closure member moves toward the second end of the valve body beyond a predetermined sealing point in the valve body and for opening the fuel passage through the valve body when the valve closure member moves toward the first end of the valve body beyond said predetermined point,
   (h) inlet restricting means extending through the fuel inlet conduit and being connected to the valve closure member for movement therewith as the valve closure member reciprocates for restricting the fuel inlet orifice, and
   (i) outlet cleaning means extending through the fuel outlet conduit and being connected to the valve closure member for movement therewith in all positions of the closure member as the valve closure member reciprocates for cleaning the fuel outlet orifice, the valve closure member being movable by the control member in the direction extending from the second end of the valve body to the first end of the valve body from:
      (1) a clean position in which the outlet cleaning means is positioned within the fuel outlet orifice of the fuel outlet conduit and the valve means closes the fuel passage through the valve body, to
      (2) a light position in which the outlet cleaning means is positioned out of the fuel outlet orifice of the fuel outlet conduit and the valve means opens the fuel passage through the valve body and the inlet restricting means is positioned within the fuel inlet orifice of the fuel inlet conduit for restricting flow of fuel through the fuel inlet orifice, to
      (3) a run position in which the outlet cleaning means is positioned out of the fuel outlet orifice of the fuel outlet conduit and the valve means opens the fuel passage through the valve body and the inlet restricting means is positioned out of the fuel inlet orifice of the fuel inlet conduit.

2. The structure of claim 1 in which the control member is rotatable in one direction from an off position to a clean position to a light position to a run position and is rotatable in the opposite direction from a run position to a light position to a clean position to an off position, the valve closure member being maintained in an off position by the control member when the control member is in the off position in which the valve means closes the fuel passage through the valve body and the outlet cleaning means is positioned out of the fuel outlet orifice of the fuel outlet conduit, the valve closure member being movable toward the second end of the body as the control member rotates from the off position to the clean position and being movable toward the first end of the valve body as the control member rotates from the clean position to the light position.

3. The structure of claim 1 in which the valve means comprises an O-ring mounted on the valve closure member for movement therewith and a shoulder on the valve body engageable with the O-ring as the valve closure member moves toward the second end of the valve closure body past said predetermined point.

4. The structure of claim 1 in which the inlet restricting means comprises an elongated rod fixedly secured to the valve closure member.

5. The structure of claim 1 in which the valve body includes a cylindrical housing extending perpendicularly to the axis of the valve body and having an outer end, the control member including a shaft rotatably mounted within the cylindrical housing of the valve body, the shaft having a first portion positioned within the cylindrical housing and a second portion extending beyond the outer end of the housing, a retainer clip mounted on the cylindrical housing and extending radially inwardly beyond the outer end thereof and being engageable with the shaft to prevent withdrawal of the first portion of the shaft from the cylindrical housing.

6. The structure of claim 5 including a control knob mounted on the second portion of the shaft, the retainer clip including a detent portion engageable with the control knob for providing tactile indication of the position of the valve closure member.

7. An improved fuel control assembly for a fuel burning apparatus comprising:
  (a) an elongated valve body having first and second ends and a fuel passage extending axially therethrough from one end to the other end,
  (b) a fuel inlet conduit connected to the first end of the valve body and having a fuel passage therethrough communicating with the fuel passage of the valve body and a fuel inlet orifice,
  (c) a fuel outlet conduit connected to the second end of the valve body and having a fuel passage therethrough communicating with the fuel passage of the valve body and a fuel outlet orifice,
  (d) a movable valve closure member axially slidably mounted within the valve body,
  (e) a control member rotatably mounted on the valve body for rotation about an axis extending perpendicularly to the direction of sliding movement of the valve closure member,
  (f) crank means connecting the control member and the valve closure member for reciprocating the valve closure member within the valve body as the control member rotates,
  (g) valve means on the valve closure member and the valve body for closing the fuel passage through the valve body when the valve closure member moves toward the second end of the valve body beyond a predetermined sealing point in the valve body and for opening the fuel passage through the valve body when the valve closure member moves toward the first end of the valve body beyond said predetermined point, and
  (h) outlet cleaning means extending through the fuel outlet conduit and being connected to the valve closure member for movement therewith in all positions of the closure member as the valve closure member reciprocates for cleaning the fuel outlet orifice, the valve closure member being movable by the control member in the direction extending from the second end of the valve body to the first end of the valve body from:
    (1) an off position in which the outlet cleaning means is positioned out of the fuel outlet orifice of the fuel outlet conduit and the valve means closes the fuel passage through the valve body, to
    (2) a clean position in which the outlet cleaning means is positioned within the fuel outlet orifice of the fuel outlet conduit and the valve means closes the fuel passage through the valve body, to
    (3) a light position in which the outlet cleaning means is positioned out of the fuel outlet orifice of the fuel outlet conduit and the valve means opens the fuel passage through the valve body, to
    (4) a run position in which the outlet cleaning means is positioned out of the fuel outlet orifice of the fuel outlet conduit and the valve means opens the fuel passage through the valve body.

* * * * *